INVENTOR
*G. E. SMITH*
BY
*H. W. Lockhart*
ATTORNEY

United States Patent Office 3,430,061
Patented Feb. 25, 1969

3,430,061
SOLID STATE WAVEGUIDE OPTICAL SECOND HARMONIC GENERATOR
George E. Smith, Murray Hill, N.J., assignor to Bell Telephone Laboratories, Incorporated, Murray Hill and Berkeley Heights, N.J., a corporation of New York
Filed Nov. 24, 1967, Ser. No. 685,639
U.S. Cl. 307—88.3           13 Claims
Int. Cl. H03k 3/42

ABSTRACT OF THE DISCLOSURE

Optical second harmonic generation with phase matching is achieved in a four layer optically nonlinear solid state waveguide structure, with variable voltage bias, upon which the fundamental is incident.

The materials for, and widths of, the layers are selected such that the waveguide effect compensates the natural dispersion of the fundamental and second harmonic wave, thereby achieving velocity-matching (equalization) with resulting optimization of second harmonic wave energy output. The materials for the waveguide are also selected so that an applied direct current electric voltage bias, or mechanical stress may afford fine tuning of this velocity-matching.

Background of the invention

This invention relates to optically nonlinear waveguide structures for generating harmonics and for mixing frequencies of optical radiation, both visible and invisible.

It is known that semiconductors such as gallium arsenide, as well as other materials such as lithium niobate, all have the property of nonlinear polarizability in response to the electric field of an optical electromagnetic wave. Such materials are called "nonlinear optical materials." This property of nonlinearity gives rise to the phenomenon of second harmonic generation, that is, when an electromagnetic wave (the "fundamental") is incident upon the nonlinear material, a second harmonic wave is thereby generated therein.

It is also known that in general the phenomenon of "dispersion" is exhibited by the nonlinear material in which the second harmonic is generated. This effect gives rise to a difference in velocity of propagation of the second harmonic and the fundamental.

Summary of the invention

For purposes of understanding the conditions which maximize the yield of second harmonic wave energy, it is helpful to visualize the second harmonic generation process as involving three waves: the fundamental itself, a second harmonic "forced" wave propagating at the same velocity as the fundamental, and a second harmonic "free" wave. The second harmonic "free" wave, in general, propagates at a different velocity from that of the fundamental and the "forced wave," due to the above-described phenomenon of dispersion in the medium. Due to this difference in propagation between the "free" and "forced" second harmonics, their respective phases are not equal throughout the medium, thus giving rise to poor efficiency of output of the second harmonic wave. Conversely, if the forced and free waves were to propagate at equal velocity, or nearly equal velocity, improved efficiency would be attained. This is equivalent to the free second harmonic wave propagating at the same velocity as the fundamental, that is to say, equalizing or "matching" the free second harmonic wave velocity with the fundamental wave velocity.

Equalization or "matching" these velocities is achieved in one specific embodiment by building a semiconductor monocrystal of gallium arsenide in four parallel layers of conductivity determining type impurities. Well-known methods in the art, such as epitaxial growth or diffusion of impurities may be used in this process. In this way, four parallel layers are formed of various zones of uniform conductivity, typically a P+INN+ zone structure, or its homologue N+IPP+. In what follows, the P+INN+ structure is discussed in detail, but the principles are equally applicable to the homologous N+IPP+ structure. It is to be understood that the symbol P+ represents a zone of relatively high conductivity and relatively high net concentration of acceptor impurities in the semiconductor. In Example 1 described hereinafter, this means in the range of about $10^{18}$ to $10^{20}$ impurity atoms per cm.$^3$. Homologously, the symbol N+ represents a zone of relatively high conductivity and net concentration of donor impurities. The P+ and N+ zones are also called "terminal zones." The symbol P, on the other hand, represents moderate conductivity and moderate acceptor impurity concentration, in the range of about $10^{16}$ to $10^{18}$ impurities per cm.$^3$; while the symbol N represents the homologue of moderate conductivity and donor impurity concentration. The symbol I represents relatively low conductivity type zones in the semiconductor, that is to say, where the net concentration of significant impurities does not exceed $10^{16}$ atoms per cm.$^3$, in Example 1. In other cases, different ranges of values of impurity concentrations may be desirable.

The waveguide velocity of an electromagnetic wave propagating through such a P+INN+ zone structure depends upon the widths of these zones, the optical dielectric constant of the host lattice, and the net impurity concentrations therein. In this invention the impurity concentrations and widths of the zones are selected such that the effect of the waveguide approximately compensates the natural dispersion of the fundamental and the free second harmonic waves. Thus, these waves propagate at approximately the same waveguide velocity, thereby yielding velocity-matching, which optimizes the amount of second harmonic wave output.

In order to achieve fine tuning of this velocity-matching, it is advantageous to utilize the well-known fact that the velocity of an electromagnetic wave in any solid (including a semiconductor) depends, among other factors, upon the concentration of free carriers. Thus, since the I and N zones contain different free carrier concentrations, the velocity of a wave of given frequency is different in the two zones. However, as is also known, at the junction of the I and N zones there is a region of substantial width in the N zone, contiguous with the I zone, where the free carriers have been depleted. Thus, this depletion region, also known as the "space charge barrier layer," behaves like an extension of the I zone insofar as the absence of free carriers is concerned, and hence insofar as the velocity of an electromagnetic wave is concerned.

When a bias voltage is applied across the P+ and N+ terminal zones, the width of the depletion region is changed; hence, the effective width of the total region wherein the velocity of an electromagnetic wave propagates with the same velocity as in the I zone, may be increased or decreased. A reverse bias voltage increases the width of this region; a forward bias voltage decreases it. By reverse bias voltage is meant a negative voltage applied to the P+ zone relative to the N+ zone, and by forward bias voltage is meant the opposite. However, a positive voltage bias, sufficient to affect the depletion region significantly, usually is not to be used in the practice of this invention, due to resulting high currents which may cause burn-out.

As a consequence of the change in width of the depletion region produced by the bias voltage, the waveguide velocities of propagation of the fundamental and free second harmonic waves are also changed. It is helpful, in this connection, to think of the waveguide velocity as some sort of average propagation velocity over the various zones. In this way, by controlling the width of the region where the electromagnetic waves propagate at the velocity corresponding to little or no free carrier charge concentration, that is to say, in the I zone plus the depletion region of the N zones, corresponding variation and control over the waveguide velocity of any given wave is easily obtained. In general, however, a variation in the voltage bias produces a change in the waveguide velocity of the free second harmonic which is different in amount from the change simultaneously produced in the waveguide velocity of the fundamental. Thus, by varying the voltage bias, fine tuning for equalizing the velocity of the fundamental with the velocity of the free second harmonic may be achieved, as set forth in greater detail in the detailed description hereinbelow.

In another specific embodiment, a four parallel layer waveguide structure of selected optically nonlinear dielectric insulating materials, of selected widths, is constructed so that again the fundamental and the free second harmonic waves propagate at approximately the same waveguide velocity, thereby achieving phase-matching, which optimizes second harmonic wave output.

Additionally, when at least one of the dielectric materials is electro-optic or photoelastic, the dielectric constant of this layer for the fundamental and free second harmonic waves can be varied and controlled by an external voltage or mechanical stress. Again, the waveguide velocity of the fundamental changes by a different amount from the free second harmonic. Thus, fine tuning for equalizing the velocities of fundamental and the free second harmonic waves may be afforded by an external source of electric voltage or stress, respectively.

Additionally, the third (or higher) harmonic wave may be generated with improved efficiency by the above-described types of waveguide generators. This may be achieved simply by constructing the waveguide in such a way as to equalize the velocity of the free third (or higher) harmonic with the fundamental, in the same way as described above for the second harmonic.

In like fashion, a waveguide of any of the types briefly described above may be constructed to serve as an optical mixer of two different waves, with improved output of the desired sum (or difference) frequency. This may be achieved by appropriately designing the waveguide such that the "forced" and "free" sum (or difference) frequency waves travel at the same waveguide velocity therein.

More generally, more than four parallel layers may be used to construct the solid state waveguides of any of the types described above. Thereby, greater flexibility may be afforded in the adjustment of the structural parameters to achieve the improved performance of these waveguide structures.

This invention, together with its objects, features and advantages may be better understood from the following detailed descriptions when read in conjunction with the accompanying drawing in which.

Example 1

Figure 1:
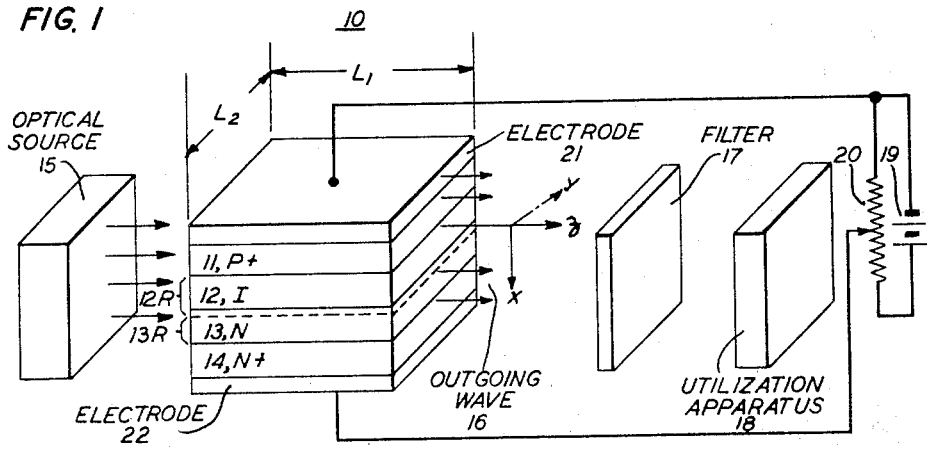
FIG. 1 is a diagram, not to scale, of a second harmonic generator apparatus including a four layer semiconductor waveguide, in accordance with one embodiment of this invention.

FIG. 1 shows a typical configuration of the zone structure of a P+INN+ crystal 10 made, for example, of gallium arsenide semiconductor material, in accordance with this invention. The crystal 10 contains four zones 11, 12, 13 14 of P+,I,N,N+ type conductivity, respecively. Placed before an optical source 15 the crystal 10 is useful for generating second harmonic waves from a fundamental light wave supplied by this optical source. Typically, a lens or lens system, not shown, is placed between the optical source 15 and the crystal 10 to focus the light upon it.

For example, the vacuum wavelentgh of the optical radiation emitted by the source 15 is 10.6 microns, such as produced by a carbon dioxide laser. The second harmonic vacuum wavelength of this radiation is equal to 5.3 microns.

The length $L_1$ (in the z direction) is selected to be large enough to afford sufficiently high gain in the second harmonic generation process. Advantageously, $L_1$ is made at least several times the "coherence length." By coherence length is meant distance in the crystal material in which the forced and free second harmonic waves get out of phase by 180° in bulk material, that is, in the absence of the waveguide effect of the layers of various zones. Typically, the coherence length is of the order of 0.01 centimeter; so typically $L_1$ is of the order of 1.0 centimeter.

Typically, $L_2$ (in the y direction) is of the order of at least 0.001 centimeter, although smaller values of $L_2$ may be used in cases where control of the modes is desired in the y as well as the x, direction. However, in all of what follows, it will be assumed that $L_2$ is at least an order of magnitude larger than the wavelength in the waveguide, thereby simplifying the mathematics involved.

The outgoing wave 16 contains the second harmonic wave generated in the crystal 10. Suitable utilization apparatus 18 is aligned on the opposite side of the waveguide crystal 10 to receive the desired second harmonic energy contained in the outgoing wave 16. For example, the utilization apparatus 18 could be a detector of the second harmonic, or any further apparatus sensitive to the second harmonic as desired. Ordinarily, it will be desirable to insert an optical filter 17 between the waveguide 10 and the utilization apparatus 18 to remove unwanted frequencies from the outgoing wave 16, such as the fundamental itself. In some instances, if the optical source 15 provides extraneous frequencies, it will be desirable to insert a filter (not shown) between the source 15 and the waveguide 10. A voltage source 19 with means 20 to vary it, typically a variable resistor (potentiometer), supplies an adjustable reverse bias to the PINN+ crystal 10, typically through the highly conductive electrode layers 21 and 22.

In the gallium arsenide semiconductor crystal 10, the first layer, zone 11, designated in FIG. 1 by P+, has a net acceptor impurity concentration of about $10^{19}$ per $cm.^3$ and typically is at least about 10 microns wide. The second layer zone 12 designated I, is relatively low conductivity semiconductor, such as intrinsic or nearly intrinsic purity semiconductor, and is made about 6.0 microns wide. The third layer zone 13 designated by N, has a net donor concentration of about $5 \times 10^{17}$ per $cm.^3$ is made about 4.0 microns wide. The width of zone 12 plus zone 13 is thus about 10 microns, which is approximately equal to the vacuum wavelength of the 10.6 micron fundamental. The fourth layer zone 14 designated by N+, has a net donor impurity concentration of about $2.4 \times 10^{18}$ per cm.³ and typically is at least about 10 microns wide. The first layer 11 and the fourth layer 14 are called "outermost" layers because of their physical position relative to the other layers 12 and 13. With these values of impurity concentrations, the dielectric constants $\epsilon$ relative to vacuum, of the various zones are calculated from the following wellknown expressions $$\epsilon = \epsilon_L - \epsilon_e \quad (1)$$

where $\epsilon_L$ is the lattice component and $\epsilon_e$ is the free carrier component of the dielectric constant. In Eq. 1, the free carrier component is calculated from the following well-known approximate expression:

$$\epsilon_e = Ne^2/\omega^2 m^* \quad (2)$$

where N is the free carrier concentration in the region, $e$ is the electronic charge on each free carrier, $\omega$ is the circular frequency of the optical radiation, $m^*$ is the effective mass of each free carrier (electron or hole) in the crystal. Using the values given above for the waveguide parameters, that is, the impurity concentration in zones 11, 12, 13, and 14; then the dielectric constants relative to vacuum of these zones are found to be as shown in the following Table I for a fundamental with a 10.6 micron vacuum wavelength, and a second harmonic with a 5.3 micron vacuum wavelength:

TABLE I.—DIELECTRIC CONSTANTS

| Zone | 5.3 micron | 10.6 micron | Net impurity per cm.³ |
| --- | --- | --- | --- |
| 11 | 10.37 | 8.75 | $1.0 + 10^{19}$ holes. |
| 12 | 10.88 | 10.72 | (Below $10^{15}$.) |
| 13 | 10.70 | 10.02 | $5.0 + 10^{17}$ electrons. |
| 14 | 10.02 | 7.28 | $2.4 + 10^{18}$ electrons. |

It is to be understood that in Table I the dielectric constant given for zone 12 is also the appropriate value for that part of zone 13 which corresponds to the depletion region.

In accordance with the theory given below, transverse electric (TE) modes are chosen for the waveguide structure shown in FIG. 1 with the dielectric constants given in Table I, along with the values for the widths of the zones given above. The mode for the 5.3 microns second harmonic free wave is selected to be trigonometric in zones 12 and 13, and exponential in zones 11 and 14; whereas the corresponding mode for the fundamental 10.6 microns wave is trigonometric only in zone 12. It is to be understood that similarly transverse magnetic (TM) waves are also possible and may be used in the practice of this invention, as should be obvious to those skilled in the art in view of this disclosure.

Initially, in the apparatus shown in FIG. 1, even though no voltage bias is applied across the terminal zones 11 and 14, as known in the art there is about 0.2 micron width to the depletion region in zone 13. Thus, the total region, where the dielectric constant is equal to the value given in Table I for zone 12, is not confined to zone 12 itself; but extends somewhat into zone 13. In FIG. 1, this is indicated by using the symbol 12R for that region of the waveguide where the dielectric constant of a wave is equal to the value given in Table I above for zone 12. Likewise, region 13R indicates that region where the dielectric constant is equal to the value for zone 13 given in Table I. Thus, in the absence of any applied bias voltage, region 12R is about 6.2 microns wide, and region 13R is about 3.8 microns wide.

Figure 2:
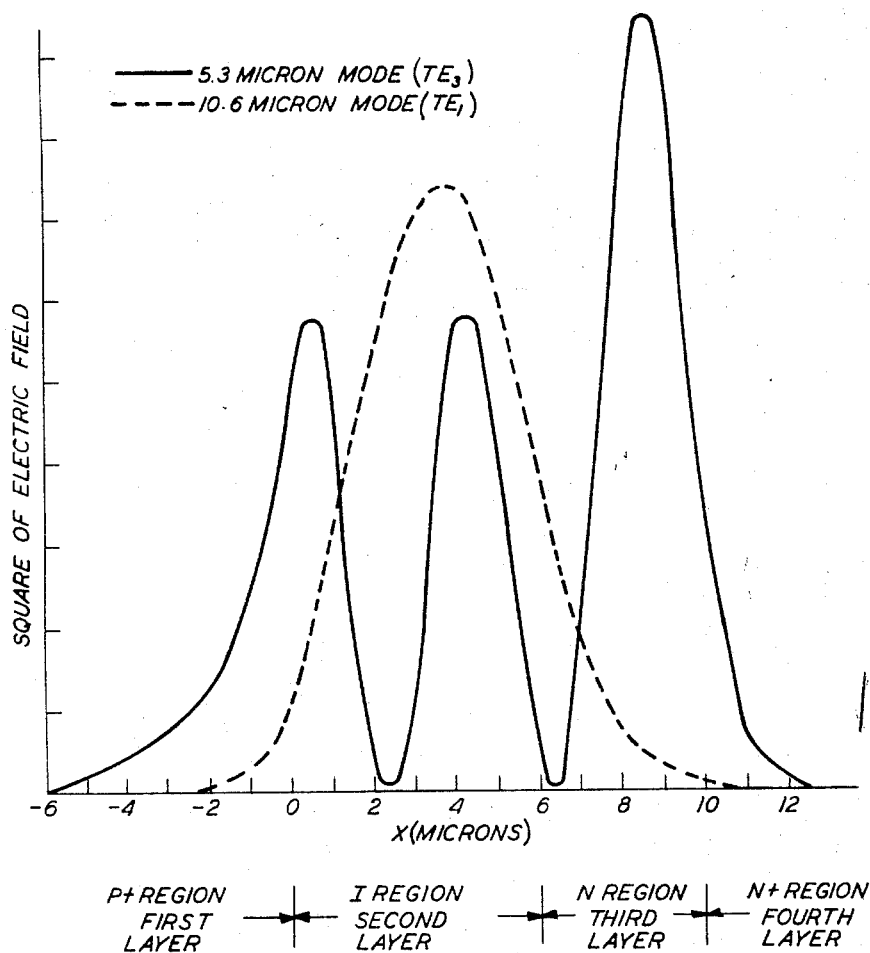
FIG. 2 is a plot of the square of the electric field versus distance for two typical traverse electric modes in the waveguide shown in FIG. 1, in accordance with this invention.

In FIG. 2, there is shown a plot of the square of the electric field versus distance across the waveguide structure, shown in FIG. 1, in the $x$ direction perpendicular to the interfaces between the layers. The solid curve therein corresponds to a typical 5.3 micron (second harmonic) TE mode of the type selected and described above. Because of the three maxima occurring in this curve, it is convenient to call this TE mode the "third order" mode, or the $TE_3$ mode.

For the mode of the fundamental wave, with a vacuum wavelength of 10.6 microns, the TE mode is chosen to be trigonometric in zone 12 and exponential in the others. The dotted curve in FIG. 2 shows the plot of energy density versus distance for a typical 10.6 micron mode of this type in the waveguide structure shown in FIG. 1. It should be understood that both curves in FIG. 2 are also typical of other wavelengths, as well as other designs of the widths and dielectric constants which lead to similar type modes of the same order. These curves are obtained from squaring Equations (8A), (B), (C), (D) and (11A), (B), (C), (D) respectively given below under theory, with arbitrary units of the square of the electric field as ordinate.

Next, the same mode is calculated in similar fashion for the cases where a reverse voltage bias is applied across the terminal zones 11 and 14, as shown in FIG. 1. This applied voltage causes an increased width of the depletion region ("space charge barrier layer"). In turn, this produces an increased effective width of the region 12R where the dielectric constant is equal to that value given in Table I for zone 12. Likewise, this reverse voltage bias correspondingly decreases the width of region 13R, where the dielectric constant is equal to the value given in Table I for zone 13.

The apparatus as shown in FIG. 1 is useful for generating second harmonic waves of even more efficiency than the similar apparatus in the absence of the variable voltage bias. However, it is to be understood that because of the variable voltage bias, the widths of the regions 12R and 13R (where the velocities correspond to their values, respectively, in zones 12 and 13 of FIG. 1) are now variable. Thereby the waveguide velocities of both the free second harmonic and the forced second harmonic (the latter having the same velocity as fundamental) can be varied; since these waveguide velocities depend upon the width of region 12R, as shown in the theory outlined below. Thus, in case the attempted velocity-matching of the waveguide structure shown in FIG. 1 is not exact, at appropriate setting of potentiometer resistor 20, the outgoing wave 16 will contain even more second harmonic wave energy.

Figure 3:
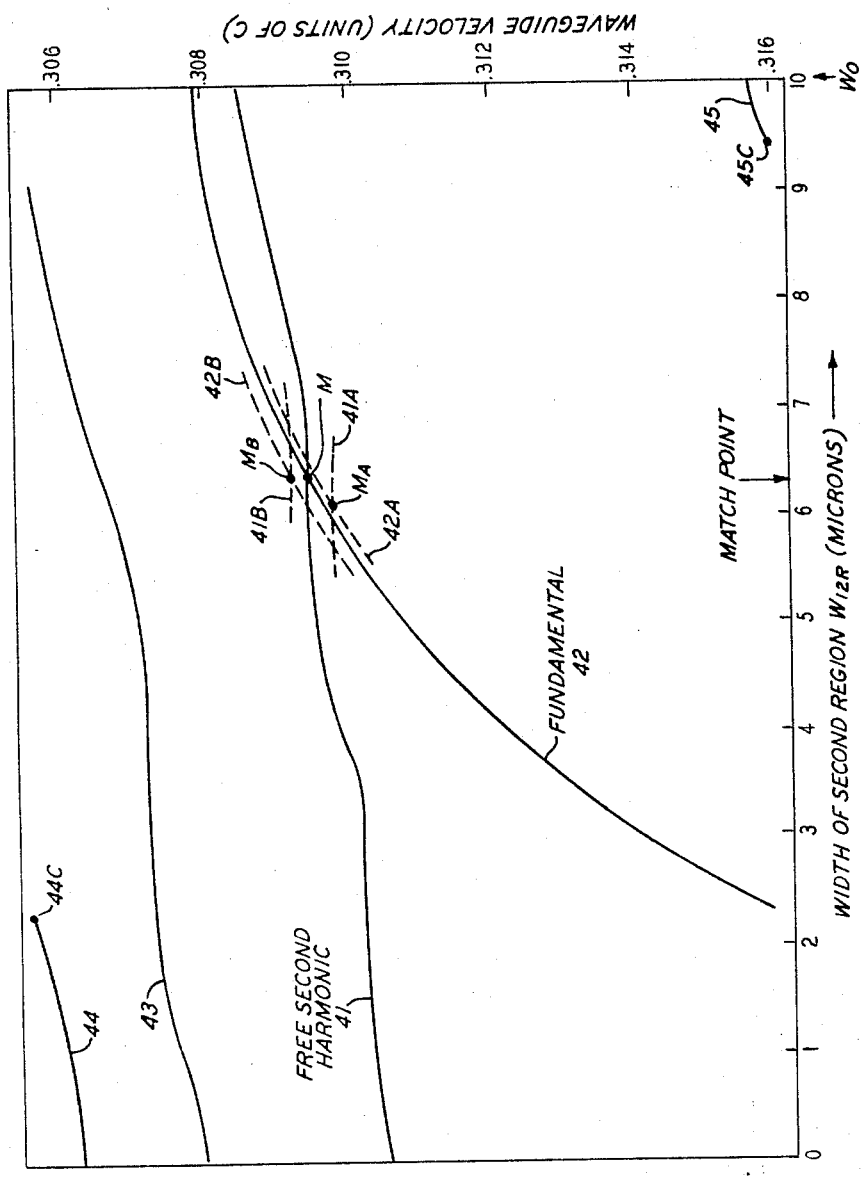
FIG. 3 is a plot of waveguide velocity of typical fundamental, and free second harmonic, traverse electric modes versus the effective width of the second layer region, in the waveguide of the apparatus shown in FIG. 1, in a specific embodiment of this invention.

In order to illustrate this, reference should be made to FIG. 3. Curve 41 in FIG. 3 shows a plot of waveguide velocity, in units of the speed of light in vacuum $c$, for the 5.3 micron (vacuum wavelength) *free* second harmonic wave versus $w_{12R}$, the width of region 12R, while keeping $w_0$, the width of regions 12R plus 13R, fixed at 10 microns. Likewise, curve 42 shows a similar plot of waveguide velocity for the 10.6 micron fundamental wave, which propagates with the same waveguide velocity as the 5.3 micron *forced* second harmonic wave. These curves 41 and 42 are obtained by use of Equations (9) and (12), respectively, given below under theory, together with Equations (5), (6), and (10). Both curves are applicable only to the corresponding TE modes shown in the curves of FIG. 2. Likewise, curves 43 and 44 are applicable to the $TE_2$ and $TE_1$ modes (not shown in FIG. 2) for the 5.3 micron free second harmonic wave with only two and one maxima, respectively, in their profiles of square of electric field versus distance. Curve 45, on the other hand, is applicable to the $TE_2$ mode of the fundamental 10.6 micron wave.

The point of intersection, labeled M in FIG. 3, of curves 41 and 42 corresponds to an optimum value for the width of region 12R, $w_{12R}$, and hence to an optimum value of the corresponding reverse voltage bias. The manner upon which $w_{12R}$ depends upon the reverse voltage bias is well-known in the art. Briefly, the increase of $w_{12R}$ is proportional to the square root of the reverse bias voltage. The optimum value of this bias occurs when its value is such that the output of second harmonic wave has a maximum intensity for an optical source 15 of given strength; and, in turn, this occurs at point M.

Point M in FIG. 3 corresponds to a value of about 6.3 microns for the width of region 12R and a velocity value of .30946 $c$ for both the free and forced second harmonic waves. In turn, point M also corresponds to a reverse voltage bias of about 50 volts, to produce the increase in $w_{12R}$ from 6.2 to 6.3 microns.

In view of the fact that even rather small positive voltage bias, say 2 volts, might cause such a high current to flow that the semiconductor waveguide would burn out, it is advantageous to fabricate the width of zone 12 slightly below the value corresponding to point M, and then to apply a moderate reverse bias voltage to control the exact width of region 12R and thereby optimize second harmonic generation. This is thus consistent with the choice of 6.2 microns for the width of zone 12, in the case where point M corresponds to the width of 6.3 microns for region 12R. In practice, the reverse bias voltage may be further adjusted by the variable resistor 20 to compensate for any errors, in impurity concentrations.

In FIG. 3, the dotted curves show the maximum displacement of curves 41 and 42 produced by a ±10 percent error in impurity doping concentration in any particular zone. In particular, the dotted curves 41A and 42A show the effect on curves 41 and 42 of such a +10 or −10 percent doping error, respectively; whereas the dotted curves 41B and 42B show the effect on curves 41 and 42, of such a +10 or −10 percent doping error, respectively. The points of intersection, corresponding to velocity-matching of the dotted curves, are designated $M_A$ and $M_B$. $M_A$ represents the intersection of curve 41A and 42A, and $M_B$ that of 41B with 42B. It is evident from inspection of the smallness of the variation in $w_{12R}$ between the values corresponding to $M_A$ and $M_B$ caused by the ±10 percent error, that, since about 200 volt reverse bias may be applied before breakdown occurs, corresponding to a width of the region 12R equal to about 6.4 microns, a reverse voltage bias of up to 200 volts may be utilized to compensate for as much as about ±10 percent errors in impurity doping concentrations.

Additionally, it should be remarked that reasonably small errors, consistent with those attainable at the present state of the art, in the width of zone 12 plus zone 13 have negligible effect on the performance of the apparatus shown in FIG. 1, and may also easily be compensated by the adjustment of the voltage bias.

It should be noted here that curves 44 and 45 are "cut off" at points 44C and 45C, respectively; but this is not deleterious because the modes corresponding to these curves are not the ones to be velocity-matched in this particular example, but may be matched in other designs of the parameters, however.

It should now be obvious how to modify the dimensions of the structure shown in FIG. 1, as well as the semiconductor materials and impurity concentrations, in order to accommodate other fundamental and second harmonic wavelengths and other modes, to obtain alternative embodiments with improved efficiency of second harmonic generation, especially in view of the theory presented below. In this connection it should be stressed that what is always important for second harmonic generation is the matching of the waveguide propagation velocities of the free second harmonic wave with the fundamental wave in the waveguide.

It may be noted that different semiconductor materials may be used for different layers, thereby forming "heterojunctions" between them, in order to achieve greater flexibility of design. However, it should be understood that advantageously the four layer structure is monocrystalline in order to avoid untoward surface effects between the layers, such as breakdown at even low reverse bias voltage due to the grain boundary.

Example 2

Figure 4:
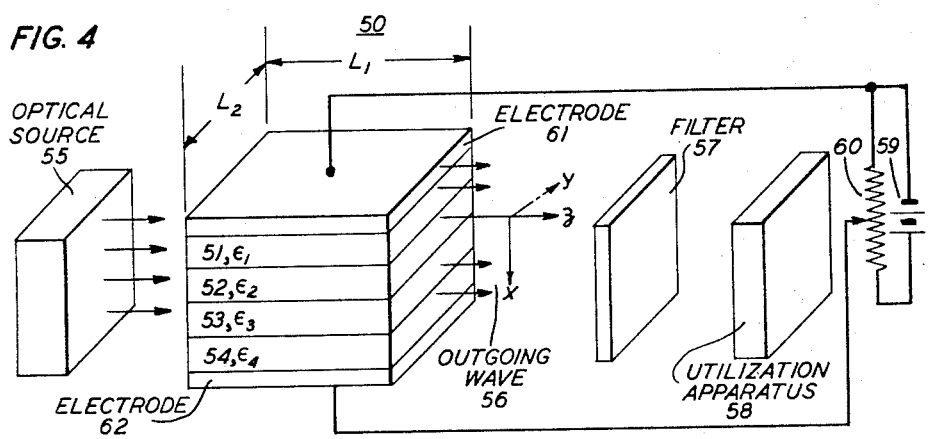
FIG. 4 is a diagram, not to scale, of a second harmonic generator apparatus, including a four layer dielectric waveguide, in accordance with another embodiment of this invention.

FIG. 4 shows a diagram of parallel dielectric layer waveguide structure 50 advantageously used in conjunction with an optical source 55, in accordance with this invention. By methods known in the art, the four parallel dielectric layers 51, 52, 53, and 54 are evaporated, sputtered or chemically deposited to form this four layer waveguide structure 50, which need not be monocrystalline. The layers 51 and 54 are also called "outermost" layers because of their physical position with respect to the intervening layers 52 and 53. The materials for the layers are chosen such that the dielectric constants $\epsilon_1$, $\epsilon_2$, $\epsilon_4$ of layers 51, 52, 53 and 54 respectively, satisfy the condition that both $\epsilon_1$ and $\epsilon_4$ are significantly smaller than either $\epsilon_2$ or $\epsilon_3$, for both the fundamental wave and the free second harmonic wave. Thus, TE and TM modes exist which are exponential in layers 51 and 54, while they are trigonometric in layers 52 or 53 or both, with respect to the $x$ direction, as shown in FIG. 4, perpendicular to the interfaces of the layer. The outgoing wave 56 contains the second harmonic wave generated in the waveguide 50. A filter 57 is positioned in the path of this outgoing wave 56 to remove any undesired frequency components and to transmit the described second harmonic wave for utilization by the apparatus 58. A variable voltage is applied across the crystal 50, typically by means of a battery 59 with variable resistor 60 connected to electrode layers 61 and 62, as shown in FIG. 4.

For example, the four layers 51, 52, 53, and 54 together with their dielectric constants relative to the vacuum, for a 0.53 micron second harmonic generated by a 1.06 micron vacuum wavelength fundamental, such as obtained from a neodymium doped calcium tungstate optical maser, may be advantageously selected as given in Table II.

TABLE II

| Layer | Material | $\epsilon$, 0.5 micron | $\epsilon$, 1.0 micron |
|---|---|---|---|
| 51 | $Al_2O_3$ | 3.2 | 3.1 |
| 52 | $LiNbO_3$ | 6.3 | 5.5 |
| 53 | BN | 5.5 | 4.5 |
| 54 | $SiO_2$ | 2.5 | 2.4 |

Advantageously, the width of the layer 52 is 0.56 micron and the width of layer 53 is 0.50 micron. Thus, the sum of the widths of layers 52 and 53 is approximately equal to the vacuum wavelength of the 1.06 micron fundamental. The lengths, $L_1$ and $L_2$, are selected in accordance with the considerations as in Example 1 above as applied to this case. Typically, therefore $L_1$ is of the order of 1.0 centimeter and $L_2$ is of the order of at least 0.001 centimeter. Also, as in the case of the semiconductor structure in Example 1 above, a TE mode is selected which is trigonometric in layers 52 and 53 and exponential in 51 and 54, for the 0.53 micron second harmonic free wave; while the TE mode is selected to be trigonometric only in layer 52, and exponential in layers 51, 53 and 54 for the 1.06 micron fundamental wave. It is these modes which are to be supported by the waveguide in this particular embodiment of the invention.

Now, in view of the above choice of material for layer 52, namely $LiNibO_3$, the dielectric constant of this layer 52 (being electro-optic, as well as nonlinear, optical material) may be varied by an applied electric voltage. Application of an electric field in the direction perpendicular to the interfaces of layer 52 with its adjacent layers 51 and 53, causes a change in the dielectric constant for the transverse electric (TE) modes, as well as for the transverse magnetic (TM) modes.

Figure 5:
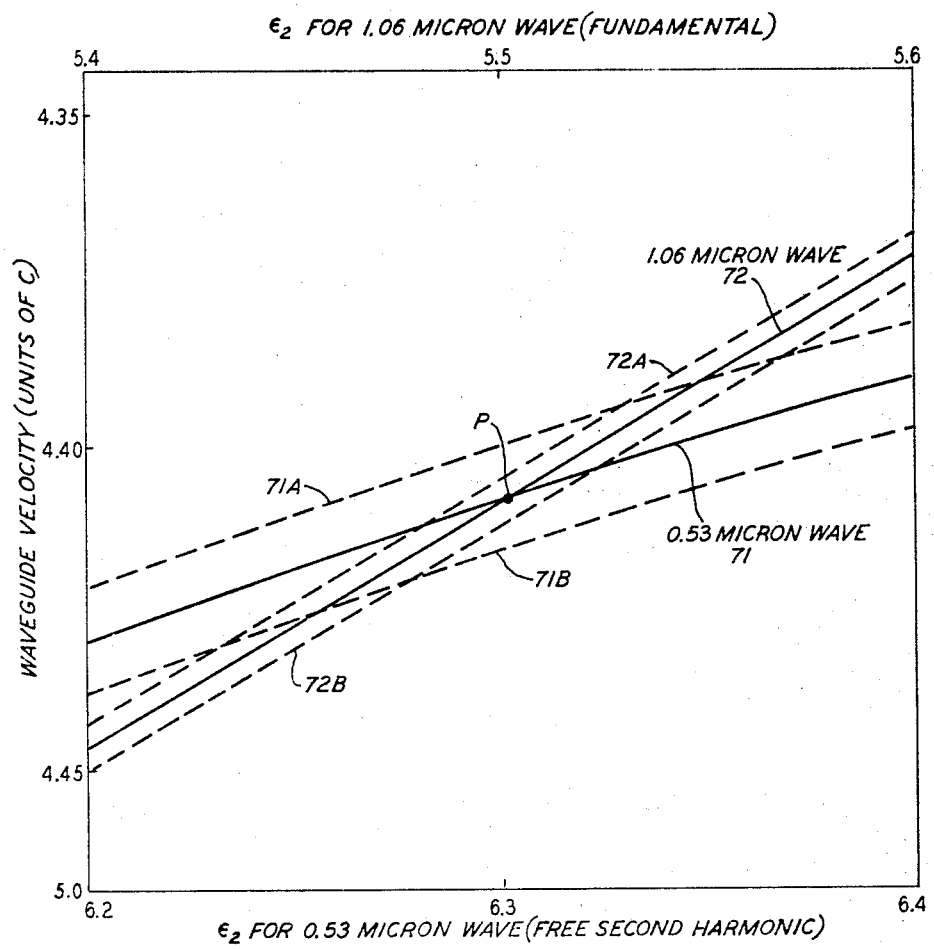
FIG. 5 is a plot of waveguide velocity of typical fundamental and free second harmonic transverse electric modes versus the dielectric constant of the second layer of the waveguide in the apparatus shown in FIG. 4.

In FIG. 5, curve 71 shows a plot of waveguide velocity, in units of $c$ (the speed of light in vacuum), for the 0.53 micron (vacuum wavelength) free second harmonic wave versus $\epsilon_2$, the dielectric constant of the second layer; the other parameters of the waveguide being given as in Table II above. Likewise, curve 72 shows a similar plot of waveguide velocity for the 1.06 micron fundamental wave, which propagates at the same velocity as the *forced* second harmonic wave. It may be remarked that the abscissas for curves 71 and 72 differ in corresponding value, due to "dispersion." These curves are obtained similarly as those in FIG. 3 by use of Equations 9 and 12 respectively, given below under theory; and they are applicable to the TE modes of the type (order) illustrated by curves shown in FIG. 2. Also, they intersect at a point P corresponding to a waveguide propagation velocity of about 0.4409 centimeter. This point of intersection P corresponds to values of $\epsilon_2$ as given in Table II above.

Additionally, the dotted curve 71A and 72A in FIG. 5 show the corresponding waveguide velocities for the same waveguide as shown by curves 71 and 72, but with a +0.01 micron error in the width of the second layer 52. Likewise, dotted curves 71B and 72B show the effect of a −0.01 micron error in the width of the second layer 52. Such errors are not serious and may be compensated by an adjustment of the resistor 60.

Accordingly, as shown in FIG. 4, the optical source 55 is arranged to furnish the fundamental wave incident upon the four layer dielectric waveguide structure with the electrode layers and variable voltage. This optical source 55 for a 1.06 micron wavelength fundamental may be a neodymium doped calcium tungstate optical maser, for example. In case the velocity-matching of the crystal structure 50 in FIG. 4 is not exact, the adjustability of the dielectric constant $\epsilon_2$ of layer 52 results in greater possible amount of second harmonic wave present in the outgoing wave 56. This greater efficiency is possible for a similar reason as that which enables greater efficiency of the arrangement shown in FIG. 1. by means of the potentiometer therein. Briefly, the reason is that fine tuning of the dielectric constant $\epsilon_2$ of the second layer 52 by means of the variable resistor 60 makes possible the fine tuning of the equality of the waveguide velocity of the forced and free second harmonic waves.

It should be clear that photoelastic material, whose refractive index can be varied by an applied mechanical stress could be used for the second layer 52, in conjunction with an appropriate source of mechanical stress instead of the electrical voltage 59. Likewise, it should be understood that for optimum amount of second harmonic generation all four layers, especially the second and third layers 52 and 53 containing most of the wave energy, are advantageously of material which have nonlinear polarizability, although only one of these layers need be. It may be remarked that materials which exhibit second harmonic generation are also electro-optic. (See "Nonlinear Optical Coefficients," 46, Bell System Technical Journal, pp. 913–956, May-June, 1967.)

As in the case of Example 1 above, the theory below may be used to calculate the waveguide velocities of the free second harmonic wave and the fundamental wave, which are to be matched, in accordance with this invention, and thereby to calculate the required parameters similar to those given in Table II above. However, here the variable parameter is the dielectric constant of one of the layers, and a plot of *waveguide velocity* vs. *this dielectric constant* is now advantageous in order to determine the value of this dielectric constant for matching the waveguide velocities. Thus, it should now be obvious how to modify the dimensions of the waveguide structures shown in FIGS. 1 and 4 as well as the choice of materials, in order to accommodate other wavelengths and other modes, to obtain alternative embodiments with improved second harmonic generation output efficiency.

Theory

It will now be shown how to find the modes of an electromagnetic wave, in a solid state waveguide of the type used in this invention. From these modes the waveguide velocities of the second harmonic free wave and fundamental wave may be calculated, and thereby the condition for matching of these velocities may be derived for a given incident fundamental wave.

In a four parallel layer structure, forming four regions, such as shown in FIGS. 1 and 4, each region is characterized by a real dielectric constant, $\epsilon_j$; with $j$ equal to 1, 2, 3 or 4 corresponding to the first, second, third or fourth region, respectively, in turn corresponding to regions 11, 12R, 13R and 14 in FIG. 1, and regions 51, 52, 53 and 54 in FIG. 4. Each dielectric constant $\epsilon_j$ in turn is equal to $$\epsilon_j = K_j \cdot \epsilon_0 \qquad (3)$$

where $\epsilon_0$ is the vacuum dielectric constant, and $K_j$ is the relative dielectric constant of the $j$th region. The second region has a width denoted by $w$, and the third region has a width denoted by $(w_0-w)$; both widths being in the $x$ direction pointing from the first region towards the fourth region. Propagation of the wave is in the $z$ direction, and the electric field is in the $y$ direction, for the transverse electric (TE) modes to be assumed. It is assumed that $L_2$ is at least an order of magnitude larger than the wavelength in the waveguide, so that it is a valid approximation to consider the waveguide of infinite extent in the $y$ direction. The $y$ component of the electric field in the $j$th region, $E_j$, is of the form $$E_j = [A_j \exp(ib_j x) + B_j \exp(-ib_j x)] \exp[i(\omega t - \beta z)] \qquad (4)$$

where $\beta$, $A_j$, $B_j$, and $b_j$ are constants to be determined from Maxwell's equations and the boundary conditions; while $\omega$ is the circular frequency of the wave, and $i$ is the square root of minus one.

The wave-equation (from Maxwell's theory) requires that for $j=$ 1, 2, 3, or 4:

$$\beta^2 = k^2 K_j - b_j^2 \qquad (5)$$

where $k$ is the free space propagation constant, equal to $\omega \div c$ ($c$=speed of light in vacuum).

Assuming no loss, $b_j$ is purely real or purely imaginary. If and only if it is imaginary, the notation:

$$p_j = -ib_j \qquad (6)$$

will be used. For definiteness, when $b_j$ is purely real, it is chosen to be positive; and when $b_j$ is purely imaginary, it is chosen to be positive imaginary, so that $p_j$ is always positive when it is defined.

Applying the boundary conditions, that both the electric field and its partial derivative in the $x$ direction (TE mode) are continuous across all three of the interfaces of the four regions, leads to six conditions expressing these relations. The physical condition that the electric fields goes to zero at $x = \pm \infty$ (i.e., deep in the fourth and first layers away from the second and third layers) imposes exponential solutions in regions 1 and 4 (that is, $p_1$ and $p_4$ are real), and two additional conditions:

$$A_1 = 0 \qquad (7A)$$

$$B_4 = 0 \qquad (7B)$$

Using these conditions, for arbitrary $B_1$ the electric fields $E_1$, $E_2$, $E_3$ and $E_4$ in the four regions may then be determined in terms of $B_1$. The electric fields for the TE modes which are supported in the waveguide, and which are trigonometric in both the second and third regions therein, are then found to be equal to:

$$E_1 = B_1 e^{p_1 x} \qquad (8A)$$

$$E_2 = B_1 [\cos b_2 x + (p_1/b_2) \sin b_2 x] \qquad (8B)$$

$$E_3 = B_1 \{\cos b_3(x-w)[\cos b_2 w + (p_1/b_2) \sin b_2 w] - (b_2/b_3) \sin b_3(x-w) [\sin b_2 w - (p_1/b_2) \cos b_2 w]\} \qquad (8C)$$

$$E_4 = E_3(x=w_0) e^{-p_4(x-w_0)} \qquad (8D)$$

subject to the condition that $$\left(\frac{b_2}{b_3}\right) \frac{\sin b_2 w - (p_1/b_2) \cos b_2 w}{\cos b_2 w + (p_1/b_2) \sin b_2 w} =$$

$$\frac{\cos b_3(w_0-w) - (b_3/p_4) \sin b_3(w_0-w)}{\sin b_3(w_0-w) + (b_3/p_4) \cos b_3(w_0-w)} \qquad (9)$$

In view of the trigonometric functions appearing in Equation 9, many orders of this type mode may exist, of which one is selected at a time. It should be remembered that the order of the mode is conveniently defined as the number of maxima in the plot of the square of electric field versus distances in the $x$ direction. In order to obtain the lowest order mode of this type, for example, only the first quadrant solution of Equaton 9 is used. Hence, for the given mode and for given dielectric materials and widths ($w$ and $w_0$), Equation 9 now may be used implicitly to determine $\beta$, through the four equations embodied in Equation 5 above. For given frequency, $\beta$ itself determines the waveguide propagation velocity, $V_g$. In fact, by inspection of Equation 4 this waveguide velocity itself is equal to $$V_g = \omega/\beta \quad (10)$$

Thus, Equation 9, together with Equations 5 and 6, may be used to determine the waveguide velocity for any mode which is trigonometric in both the second and third regions.

Similarly, the electric fields for the TE modes, which is trigonometric in only one region, say, the second region, and exponential in all the other regions, are found to be equal to $$E_1 = B_1 e^{p_1 x} \quad (11A)$$

$$E_2 = B_1[\cos b_2 x + (p_1/b_2) \sin b_2 x)] \quad (11B)$$

$$E_3 = B_1\{\cos h\, p_3(x-w)[\cos b_2 w + p_1/b_2 \sin b_2 w] - (b_2/p_3)\sin h\, p_3(x-w) [\sin b_2 w - (p_1/b_2 \cos b_2 w]\} \quad (11C)$$

$$E_4 = E_3(x=w_0) e^{-p_4(x-w_0)} \quad (11D)$$

subject to the condition that $$\left(\frac{b_2}{p_3}\right) \frac{\sin b_2 w - (p_1/b_2) \cos b_2 w}{\cos b_2 w + (p_1/b_2) \sin b_2 w} =$$

$$\frac{\cosh p_3(w_0-w) + (p_3/p_4) \sinh p_3(w_0-w)}{\sinh p_3(w_0-w) + (p_3/p_4) \cosh p_3(w_0-w)} \quad (12)$$

It should be noted that the mode described in Equations 11 and 12 is also subject to the arbitrary condition (for definiteness) that the dielectric constant of the third region is smaller than that of the second region. Equation 12 together with Equations 5 and 6 may be used to determine the waveguide velocity for any mode which is trigonometric in only the second region and exponential in the other regions.

In the practice of this invention, it is important to design the waveguide such that it supports the propagation of the incident fundamental wave in a mode which has a "matching point" (equal waveguide velocity) with some mode of the free second harmonic wave. Thus, while Equation 12 implicitly determines $\beta$ and hence the waveguide velocity of the fundamental wave, Equation 9 implicitly determines the waveguide velocity of the free second harmonic wave, and these two velocities are to be matched in the practice of the specific embodiments of Examples 1 and 2 in this invention. It is possible to match other types of modes in other embodiments with different parameters, however. Accordingly, in any event, these velocities are made equal (matched) by appropriate selection of the parameters. In this selection process, it is advantageous to plot these velocities against a variable parameter, such as the width of a region (as shown in Example 1 and illustrated in FIG. 3) or the dielectric constant of a region (Example 2, FIG. 5). It is also advantageous to select for the variable regions either the second or third region, or both.

It is clear that it is also possible to carry out a similar procedure for the transverse magnetic (TM) modes. However, here the boundary condition for the partial derivative with respect to $x$ of the $y$ component of magnetic field strength, $H_y$, is slightly different from the boundary condition on the partial derivative of the electric field, $E_y$, above. For the TM case, this condition is that this partial derivative of the magnetic field, $H_y$, divided by the corresponding dielectric constant is continuous, as is well known.

It may be noted that it has been tacitly assumed above that the magnetic permeability is the same in all layers. In cases where this is not so, it should be obvious to workers in the art that all that needs be done is to modify the boundary conditions appropriately. In any event, as should be familiar to workers in the art, for TE modes the partial derivative of $E_y$ with respect to $x$, and divided by the magnetic permeability, is continuous. Thus, the conditions for velocity-matching may, in such cases, contain the magnetic permeabilities of the layers and thereby differ from Equations 9 and 12 above. But in all events, the technique for designing the waveguide follows the above discussion, in connection with FIGS. 3 and 5, with the appropriate modification of Equations 9 and 12 necessitated by the different permeabilities.

It may be remarked that in another aspect, by inspection of Equation 14, it can be seen that $\beta$ is the waveguide propagation constant, the latter being equal to $2\pi$ divided by the guide wavelength. Thus, equalization (or "matching") of the waveguide velocities of the free second harmonic wave with the fundamental wave, in accordance with this invention, is equivalent to making the guide wavelength of the fundamental twice that of the free second harmonic, in view of Equation 10.

Criteria for dielectric constants and widths of layers

Rearranging Equation 5, it is easy to see that $$K_j = (\beta/k)^2 + (b_j/k)^2 \quad (5A)$$

In view of Equation 10 and the relation that $k=\omega/c$, this may be rewritten as $$K_j = (c/V_g)^2 + (b_j c/\omega)^2 \quad (5B)$$

Thus, in accordance with this invention, the waveguide velocity of the free second harmonic is equal to that of the fundamental, i.e., $V_g$ is the same for both. But in the third region, in Examples 1 and 2 above the mode for the fundamental is exponential, and so $b_3$ is purely imaginary for the fundamental. In this same third region however, the mode for the free second harmonic is trigonometric, and so $b_3$ is real for the free second harmonic wave. Therefore, by inspection of Equation 5B, it follows that $K_3$, the dielectric constant in the third region, should be smaller for the fundamental wave than for the free second harmonic wave, in order for these modes embodied in Examples 1 and 2 above to be supported by the waveguide. It should be remembered here that this relation depends upon the condition that the dielectric constant $K_2$ for the fundamental wave in the second region (where $b_2$ of the fundamental is real, for trigonometric behavior) is larger than $K_3$ for the fundamental wave in the third region (where $b_3$ of the fundamental is purely imaginary, for exponential behavior). See the remark following Equation 12 above; and see Equation 5B above. Thus, in order to support simultaneously, and with equal waveguide velocity, the fundamental mode embodied in Equations 11 and 12 above and the free second harmonic mode embodied in Equations 8 and 9 above; it is important that the dielectric constant $K_3$ for the fundamental wave in the third region be the smallest of the four dielectric constants for the following waves; fundamental wave in second region, fundamental wave in third region, free second harmonic wave in second region, and free second harmonic wave in third region.

With respect to $K_1$ and $K_4$, the respective dielectric constants in the first and fourth regions, in order to ensure exponential solutions in the first and fourth regions for both fundamental and second harmonic waves, the dielectric constants in these regions for both waves should be smaller than their respective values in the second or third regions, or both. However, there need be no stringent relation satisfied between the dielectric constant in the first region relative to the fourth region, so long as the waveguide structure will support the desired modes (without "cut-off"). Thus, the above choice for the mode for the fundamental wave, trigonometric solution in the second region and exponential in the third region, is purely arbitrary; at least in the sense of renumbering by interchanging the first and fourth regions and thereby choosing the mode solution, in the practice of this invention, as the trigonometric in the third region and exponential in the second region, instead of the above choice.

More generally, the four layer optically nonlinear waveguide structure in this invention of the types described in Examples 1 and 2 above, may be designed to support the velocity-matched modes, of the fundamental and the free second harmonic waves, which are not necessarily trigonometric in one layer (or region) and two layers (or regions), respectively. All that is important here is that for both waves the corresponding modes of each be trigonometric in merely at least one layer (or region), which is not an outermost layer, and exponential in both outermost layers; and that velocity-matching occur for these modes. Thus, for each wave the dielectric constant for that frequency need satisfy merely the conditions that it be smaller in both outermost layers than in at least one of the inner layers (where the corresponding velocity-matched mode is trigonometric) and that it be sufficiently small in both these outermost layers so as to support the modes to be matched, without "cut-off" in a region of velocity-matching. Additionally, it is advantageous that the arithmetic sum of the widths of the inner layers be approximately equal to one vacuum wavelength of the fundamental, in order to ensure the existence of suitable TE or TM modes in the waveguide.

Furthermore, the four layer optically nonlinear waveguide structures of the types described above may be designed to support the velocity-matched modes of the fundamental wave and the free third (or higher) harmonic wave, thereby serving as a third (or higher) harmonic generator.

Also, more generally the waveguide structures mentioned above may advantageously be built up of more than four parallel layers, thereby achieving greater flexibility of design. Again, as in the case of the above described four layer structure, the velocity-matched modes of the fundamental wave and the free second (or higher) harmonic wave each need be trigonometric in only at least one layer (or region) which is not an outermost layer and exponential in both outermost layers. Thus, for each frequency, the dielectric constant for the wave of that frequency need satisfy merely the conditions that it be smaller in both outermost layers than in at least one of the inner layers (where the corresponding velocity-matched mode is trigonometric); and that it be sufficiently small in both these outermost layers so as to support the mode to be matched, without "cut-off," in a region of velocity-matching. Additionally, it is advantageous that the arithmetic sum of the widths of the inner layers be approximately equal to one vacuum wavelength of the fundamental, in order to ensure the existence of suitable TE or TM modes which are velocity-matched in the waveguide.

Optical mixer

Figure 6:
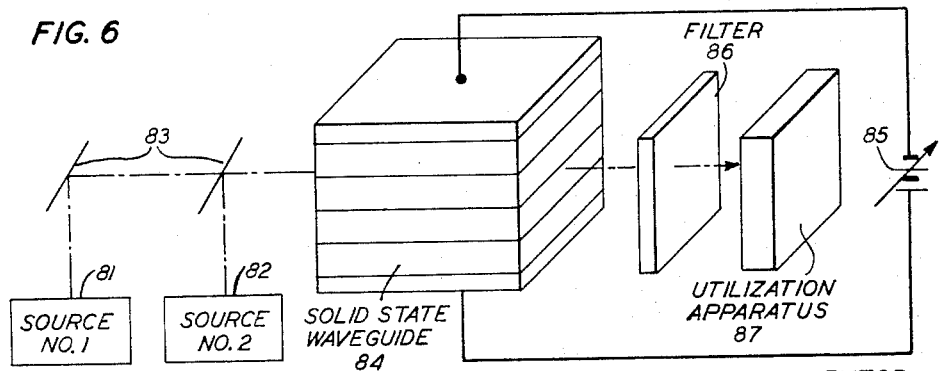
FIG. 6 is a diagram, not to scale, of an arrangement for optical mixing in accordance with this invention.

In FIG. 6, there is shown apparatus for mixing optical waves emitted from an optical source conveniently consisting of sources 81 and 82, advantageously lasers of different frequency, to achieve a desired mixed frequency, typically the sum (or difference) frequency of the two waves. Alternatively, a single source of the two frequencies, such as a mercury vapor lamp, may be used instead of the separate sources 81 and 82. For simultaneously passing the two waves to be mixed from the two sources 81 and 82, reflecting elements 83 are advantageous. An optically nonlinear parallel layer solid state waveguide structure 84 is positioned in the path of the two waves. This structure 84 should be designed with its parameter of layer thicknesses and dielectric constants thereof chosen such that there is a mode supported therein for which the "free" wave of the desired mixed frequency propagates at the same waveguide velocity as the "forced" wave of this same desired mixed frequency. The technique for so designing the parameters, together with the advantageous application of an adjustable voltage 85, should now be obvious in view of the above disclosure. A filter 86 is positioned in the path of the outgoing wave from the waveguide structure 84 for removal of any undesired frequency components and for transmission of the desired wave of mixed frequency to utilization apparatus 87.

Although the invention has been described in terms of specific embodiments, it will be appreciated that the techniques described above have application to other embodiments, devices, and arrangements within the scope of this invention, which should be obvious to workers skilled in the art. In addition, reference is made to vol. 46, Bell System Technical Journal p. 913, at pp. 945–946 (May-June 1967), for a representative list of nonlinear optical materials.

What is claimed is:

1. Apparatus for generating the second harmonic of an optical fundamental wave comprising:
   (a) a source of the optical fundamental wave;
   (b) a solid state member positioned in the path of the fundamental wave such that it propagates through the said solid state member, said member having a plurality of successive parallel layers including first and second outer layers and at least two intervening layers, the said outer layers each having a dielectric constant at the frequencies of operation that is less than the dielectric constant of both of the intervening layers, at least one of said intervening layers having a nonlinear polarizability in response to the fundamental wave, the intervening layers both being of such widths as to provide a significant waveguiding effect which approximately equalizes the waveguide velocities therein, in a direction parallel to said layers, of the fundamental wave and the free second harmonic wave generated in said at least one of the layers;
   (c) means for applying a voltage across the layers of the said solid state member, in order to equalize more nearly the said waveguide velocities; and
   (d) means for utilizing the optical energy of the second harmonic waves exiting from the solid state member.

2. Apparatus for mixing first and second optical waves of different frequencies to produce a wave of a desired third frequency comprising:
   (a) a solid state member positioned in the path of the said first and second optical waves, said member having a plurality of successive parallel layers including first and second outer layers, and at least two intervening layers, the said outer layers each having a dielectric constant at the frequencies of operation that is less than the dielectric constant of both of the intervening layers, at least one of said intervening layers having a nonlinear polarizability in response to the said first and second optical waves, the intervening layers both being of such widths as to provide a significant waveguiding effect which approximately equalizes the waveguide velocities therein in a direction parallel to said layers, of the forced and free waves of desired frequency generated in said at least one of the layers;
   (b) means for providing the first and second waves;
   (c) means for applying a voltage across the layers of the said solid state member in order to equalize more nearly the said waveguide velocities; and
   (d) means for utilizing the optical energy of the third frequency exiting from the solid state member.

3. In an apparatus for generating optical energy of a desired frequency and in which optical wave energy of a frequency different from said desired frequency is supplied by a source, a solid state member having a plurality of parallel layers including first and second outer layers and at least two intervening layers, the said outer layers each having a dielectric constant at the frequencies of operation that is less than the dielectric constant of both of the intervening layers, at least one of said intervening layers having a nonlinear polarizability in response to the optical wave energy applied thereto, the intervening layers both being of such widths as to provide a significant waveguiding effect which approximately equalizes the waveguide velocities in a direction parallel to said layers, of the forced and free waves of desired frequency generated in said at least one of the layers.

4. In an apparatus for generating optical energy of a desired frequency, a solid state member in accordance with claim 3, in which the arithmetic sum of the widths of all the said intervening layers is equal to approximately one vacuum wavelength of the optical energy applied thereto.

5. In an apparatus for generating optical energy of a desired frequency,
   (a) a solid state member in accordance with claim 3;
   (b) means for applying a voltage across the layers of the said solid state member.

6. In an apparatus for generating the second harmonic of an incident fundamental optical wave, a solid state member comprising first, second, third and fourth successive parallel layers, the dielectric constants for the fundamental wave in both the first and fourth layers being smaller than the dielectric constants for the said fundamental wave in both the second and third layers; the dielectric constants for the second harmonic wave in both the first and fourth layers being smaller than the dielectric constants for the said second harmonic wave in both the second and third layers; the dielectric constant for the fundamental wave in the third layer being smaller than the dielectric constants for the second harmonic wave in both the second and third layers, and also being smaller than the dielectric constant for the said fundamental wave in the second layer; the dielectric constant for the second harmonic wave in the third layer being smaller than in the second layer; at least one of the layers having a nonlinear optical polarizability in response to the fundamental wave; the second and third layers both being of such widths as to provide a significant waveguiding effect which approximately equalizes the waveguide velocities therein, in a direction parallel to said layers, of the fundamental wave and the free second harmonic wave generated in the said at least one of the layers.

7. In an apparatus for generating the second harmonic of an incident fundamental optical wave
   (a) a solid state member in accordance with claim 6; and
   (b) means for applying a voltage across the layers of the said member.

8. Apparatus for generating the second harmonic of an optical fundamental wave which comprises:
   (a) a solid state member in accordance with claim 6 positioned in the path of the fundamental wave such that it propagates in the said direction through the member, and
   (b) means for providing the optical fundamental wave.

9. In an apparatus for generating the second harmonic of an incident fundamental optical wave with a vacuum wavelength of approximately 1.06 microns, a solid state member in accordance with claim 6 in which the first layer is aluminum oxide, the second layer is lithium niobate with a width of approximately 0.56 micron, the third layer is boron nitride with a width of approximately 0.50 micron, and the fourth layer is silicon dioxide.

10. Apparatus for generating the second haromic of a fundamental optical wave with a vacuum wavelength of approximately 1.06 microns, comprising:
   (a) a solid state member in accordance with claim 9, positioned in the path of the fundamental optical wave such that it propagates in the said direction through the member;
   (b) means for providing the fundamental optical wave; and
   (c) means for applying a voltage across the layers of the said solid state member.

11. In an apparatus for generating the second harmonic of an incident fundamental optical wave, a solid state member comprising first, second, third and fourth succesive parallel layers, the first layer comprising high conductivity semiconductor of a first conductivity type, the second layer comprising low conductivity semiconductor, the third layer comprising moderate conductivity semiconductor of a conductivity type opposite the said first conductivity type, the fourth layer comprising high conductivity semiconductor of the same conductivity type as that of third layer, at least one of the layers having a nonlinear optical polarizability in response to the fundamental wave, the second and third layers both being of such widths as to provide a significant waveguiding effect which approximately equalizes the waveguide velocities therein, in a direction parallel to said layers, of the fundamental wave and the free second harmonic wave generated in the said at least one of the layers.

12. In an apparatus for generating the second harmonic, of an incident fundamental optical wave with a vacuum wavelength of about 10.6 microns, a solid state member in accordance with claim 11, in which the first layer is gallium arsenide containing a net acceptor impurity concentration of about $10^{19}$ per cubic centimeter, the second layer is gallium arsenide containing a net significant impurity concentration below $10^{15}$ per cubic centimeter and having a width of about 6 microns, the third layer is gallium arsenide containing a net donor impurity concentration of about $5 \times 10^{17}$ per cubic centimeter and having a width of about 4 microns, and the fourth layer is gallium arsenide having a net donor impurity concentration of about $3 \times 10^{18}$ per cubic centimeter.

13. Apparatus for generating the second harmonic, of a fundamental optical wave with a vacuum wavelength of about 10.6 microns, comprising:
   (a) a solid state member in accordance with claim 12, positioned in the path of the fundamental optical wave such that it propagates in the said direction through the member;
   (b) means for providing the fundamental optical wave; and
   (c) means for applying a bias voltage across the layers of the said member.

No references cited.

ROY LAKE, *Primary Examiner.*

DARWIN R. HOSTETTER, *Assistant Examiner.*

U.S. Cl. X.R.

321—69; 330—5